United States Patent
Biswas et al.

(10) Patent No.: US 11,446,915 B2
(45) Date of Patent: Sep. 20, 2022

(54) ROLL-TO-ROLL SLOT DIE COATING METHOD TO CREATE INTERLEAVING MULTI-LAYERED FILMS WITH CHEMICAL SLURRY COATINGS

(71) Applicant: UT-Battelle, LLC, Oak Ridge, TN (US)

(72) Inventors: Kaushik Biswas, Oak Ridge, TN (US); David Lee Wood, III, Oak Ridge, TN (US); Kelsey M. Grady, Oak Ridge, TN (US); Natasha B. Ghezawi, Oak Ridge, TN (US); Pengfei Cao, Oak Ridge, TN (US); Tomonori Saito, Oak Ridge, TN (US)

(73) Assignee: UT-BATTELLE, LLC, Oak Ridge, TN (US)

( * ) Notice: Subject to any disclaimer, the term of this patent is extended or adjusted under 35 U.S.C. 154(b) by 179 days.

(21) Appl. No.: 16/895,006

(22) Filed: Jun. 8, 2020

(65) Prior Publication Data
US 2020/0391495 A1  Dec. 17, 2020

Related U.S. Application Data

(60) Provisional application No. 62/861,373, filed on Jun. 14, 2019.

(51) Int. Cl.
*B32B 37/15* (2006.01)
*B29C 73/22* (2006.01)
*B32B 38/16* (2006.01)

(52) U.S. Cl.
CPC .......... *B32B 37/153* (2013.01); *B29C 73/22* (2013.01); *B32B 2038/168* (2013.01); *B32B 2305/77* (2013.01); *B32B 2307/304* (2013.01)

(58) Field of Classification Search
CPC .......... B32B 37/153; B32B 2038/168; B32B 2305/77; B32B 2307/304; B32B 2250/03;
(Continued)

(56) References Cited

U.S. PATENT DOCUMENTS 5,790,304 A   8/1998  Sanders
9,951,630 B2  4/2018  Hass
(Continued)

OTHER PUBLICATIONS

Park et al., "Roll-to-Roll Coating Technology and Its Applications: A Review", Int'l Journal of Precision Engineering and Manufacturing, vol. 17, No. 4, pp. 1-14, Apr. 2016. (Year: 2016).*
(Continued)

*Primary Examiner* — Michael N Orlando
*Assistant Examiner* — Christopher W Raimund
(74) *Attorney, Agent, or Firm* — Warner Norcross + Judd LLP

(57) ABSTRACT

An improved method for manufacturing a continuous self-healing barrier film is provided. The method includes slot-die coating opposing sides of a separator substrate with a curing agent slurry and a curable resin slurry using a single-sided coating line or a tandem coating line. The method also includes sequentially interleaving inner and outer protective layers via a continuous roll-to-roll process to create a multi-layered barrier film. The barrier film can optionally be formed into a barrier envelope, and an insulating core material can be inserted into the barrier envelope to define an enclosure. Evacuating and sealing the enclosure along a perimeter of the barrier envelop forms a self-healing vacuum insulation panel with excellent properties for use as a building material and in refrigeration systems, for example. The barrier film can alternatively be used in the manufacture of tires, roofing, cargo containers, food packaging, and pharmaceutical packaging, for example.

9 Claims, 4 Drawing Sheets

(58) Field of Classification Search
CPC ... B32B 27/08; B32B 2250/24; B32B 27/302; B32B 27/32; B32B 27/36; B32B 2255/10; B32B 2255/205; B32B 2255/26; B32B 2307/7242; B32B 2307/7244; B32B 37/24; B32B 37/02; B32B 2037/243; B32B 2419/06; B32B 2439/40; B32B 2439/70; B32B 2439/80; B32B 2605/00; B29C 73/22; B29D 7/01; F16L 59/065
See application file for complete search history.

(56) References Cited

U.S. PATENT DOCUMENTS

| | | | | |
|---|---|---|---|---|
| 2009/0191402 | A1* | 7/2009 | Beiermann | B32B 27/12 428/221 |
| 2013/0224601 | A1* | 8/2013 | Burnside | H01M 4/13 429/233 |
| 2014/0141254 | A1* | 5/2014 | Araya | B32B 27/08 428/414 |
| 2014/0295068 | A1* | 10/2014 | Nanba | H01M 4/0435 427/122 |

OTHER PUBLICATIONS

Frey, Steffen, and Dirk Görlich. "FG/FxFG as well as GLFG repeats form a selective permeability barrier with self-healing properties." The EMBO journal 28.17 (2009): 2554-2567.

Dou, Yibo, et al. "Humidity-triggered self-healing films with excellent oxygen barrier performance." Chemical Communications 50.54 (2014): 7136-7138.

Hillewaere, Xander KD, and Filip E. Du Prez. "Fifteen chemistries for autonomous external self-healing polymers and composites." Progress in Polymer Science 49 (2015): 121-153.

Zhu, Dong Yu, Min Zhi Rong, and Ming Qiu Zhang. "Self-healing polymeric materials based on microencapsulated healing agents: From design to preparation." Progress in Polymer Science 49 (2015): 175-220.

Zavada, Scott R., et al. "Rapid, puncture-initiated healing via oxygen-mediated polymerization." ACS Macro Letters 4.8 (2015): 819-824.

Brunner, Samuel, and Karim Ghazi Wakili. "Hints for an additional aging factor regarding the thermal performance of vacuum insulation panels with pyrogenic silica core." Vacuum 100 (2014): 4-6.

U.S. Department of Energy, Building Technologies Office, Windows and Building Envelope Research and Development: Roadmap for Emerging Technologies, Feb. 2014, available online at http://energy.gov/sites/prod/files/2014/02/f8/BTO_windows_and_envelope_report_3.pdf.

R25 Polyisocyanurate Composite Insulation Material, 2016 Building Technologies Office Peer Review, U.S. Department of Energy, available online at http://energy.gov/sites/prod/files/2016/04/f30/31395_Biswas_040616-1020.pdf.

PRLog. R-50 Systems, LLC $200,000 in Construction Costs on GSA Project. 2016. Available online at https//www.prlog.org/12600699-50-systems-llc-saves-200000-in-construction-costs-ongsa-project.html.

U.S. Department of Energy. Energy l-Corps Cohort 3 Teams. Technology-To-Market. 2016. Available online at http://energy.gov/eere/technology-to-market/lab-corps-cohort-3-teams#onl-maiforbldgs.

* cited by examiner

ROLL-TO-ROLL SLOT DIE COATING METHOD TO CREATE INTERLEAVING MULTI-LAYERED FILMS WITH CHEMICAL SLURRY COATINGS

CROSS-REFERENCE TO RELATED APPLICATIONS

This application claims the benefit of U.S. Provisional Application 62/861,373, filed Jun. 14, 2019, the disclosure of which is incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

FIELD OF THE INVENTION

The present invention relates to a method for manufacturing barrier films for vacuum insulation panels and other articles having increased durability over prior art systems.

BACKGROUND OF THE INVENTION

Vacuum insulation panels are widely used for insulating refrigerators and freezers and are also used in shipping containers and refrigerated cargo areas of trains, trucks, and aircraft. Vacuum insulation panels provide extremely low thermal conductivity, particularly when compared to fibrous insulation materials and polymer foams, such as foamed polystyrene.

Vacuum insulation panels generally include an insulating core within a gas-tight enclosure from which air and water has been evacuated. The gas-tight enclosure requires a barrier film, which is critical to maintaining its extremely low thermal conductivity. If the barrier film is damaged (punctured or cut), however, it allows air and/or water vapor to permeate into the core, resulting in a loss of vacuum and an increase in thermal conductivity to that of foam and fibrous insulation materials. The integrity of the barrier film is therefore required in order to maintain a low thermal conductivity throughout the service life of each panel.

An increased emphasis in energy efficiency has prompted renewed interest in the development of vacuum insulation panels as a building insulation material. However, the development of vacuum insulation panels as a building insulation material has been hindered by their high cost and fragility. Accordingly, there remains a continued need for a method of manufacturing a low cost barrier film, and in particular, a scalable method of manufacturing a low cost, self-healing barrier film for the assembly of vacuum insulation panels and other articles, including tires, roofing, cargo containers, food packaging, and pharmaceutical packaging, for example.

SUMMARY OF THE INVENTION

An improved method for manufacturing a continuous self-healing barrier film is provided. The method includes slot-die coating opposing sides of a separator substrate with a curing agent slurry and a curable resin slurry using a single-sided coating line or a tandem coating line. The method also includes sequentially interleaving inner and outer protective layers via a continuous roll-to-roll process to create a multi-layered barrier film. The barrier film can optionally be formed into a barrier envelope, and an insulating core material can be inserted into the barrier envelope to define an enclosure. Evacuating and sealing the enclosure along a perimeter of the barrier envelop forms a self-healing vacuum insulation panel with excellent properties for use as a building material and in refrigeration systems, for example. The barrier film can alternatively be used in the manufacture of tires, roofing, cargo containers, food packaging, and pharmaceutical packaging, for example.

In one embodiment, the method for manufacturing a continuous self-healing barrier film includes slot-die coating a first major surface of the separator substrate with the curing agent slurry, the curing agent slurry including an imine-functional group or a thiol-functional group. The method then includes joining a first continuous web (which becomes an inner protective layer) to the now-coated first surface. The method then includes slot-die coating a second major surface of the separator substrate with the curable resin slurry, the curable resin slurry including an epoxide-functional group and/or an acrylate-functional group. The method then includes joining a second continuous web (which becomes an outer protective layer) to the now-coated second surface and rewinding the multi-layered barrier film about a take-up reel.

Either the curable resin slurry or the curing agent slurry can be applied on first and second single-sided coating lines, respectively, each line having an unwind, a coating station, an interleaving station, and a rewind. The order of the curable resin slurry and the curing agent slurry as the first or the second layer can be switched based on the required assembly for certain applications and the optimal final performance. Alternatively, the curable resin slurry and the curing agent slurry are deposited on a tandem coating line having an unwind, a first coating station, a first interleaving station, a second coating station, a second interleaving station, and a rewind. The thickness of the curing agent layer and the curable resin layer is controlled by application of the respective slot-die heads. For example, the curing agent layer and the curable resin layer can have a thickness of between 5 μm and 200 μm, inclusive. The curing agent slurry or the curable resin slurry is selected to have a sufficiently low viscosity to penetrate any gap within the separator substrate and enable a quick reaction. Upon damage to the separator substrate, the curing agent slurry or the curable resin slurry penetrates the separator substrate due to a pressure differential across the barrier film and reacts with the other of the curable resin slurry and the curing agent slurry to seal any cuts or punctures to the separator substrate.

These and other features and advantages of the present invention will become apparent from the following description of the invention, when viewed in accordance with the accompanying drawings and appended claims.

DETAILED DESCRIPTION OF THE CURRENT EMBODIMENTS

The current embodiments include a system and method for manufacturing a continuous self-healing barrier film for a variety of articles, including vacuum insulation panels, packaging (e.g., food packaging and pharmaceutical packaging), roofing, cargo containers, and tires. The system and method generally includes slot-die coating opposing sides of a separator layer with a curing agent slurry and a curable resin slurry using single-sided coating lines or tandem coating lines and sequentially interleaving inner and outer protective layers to form the self-healing barrier film.

Figure 1:
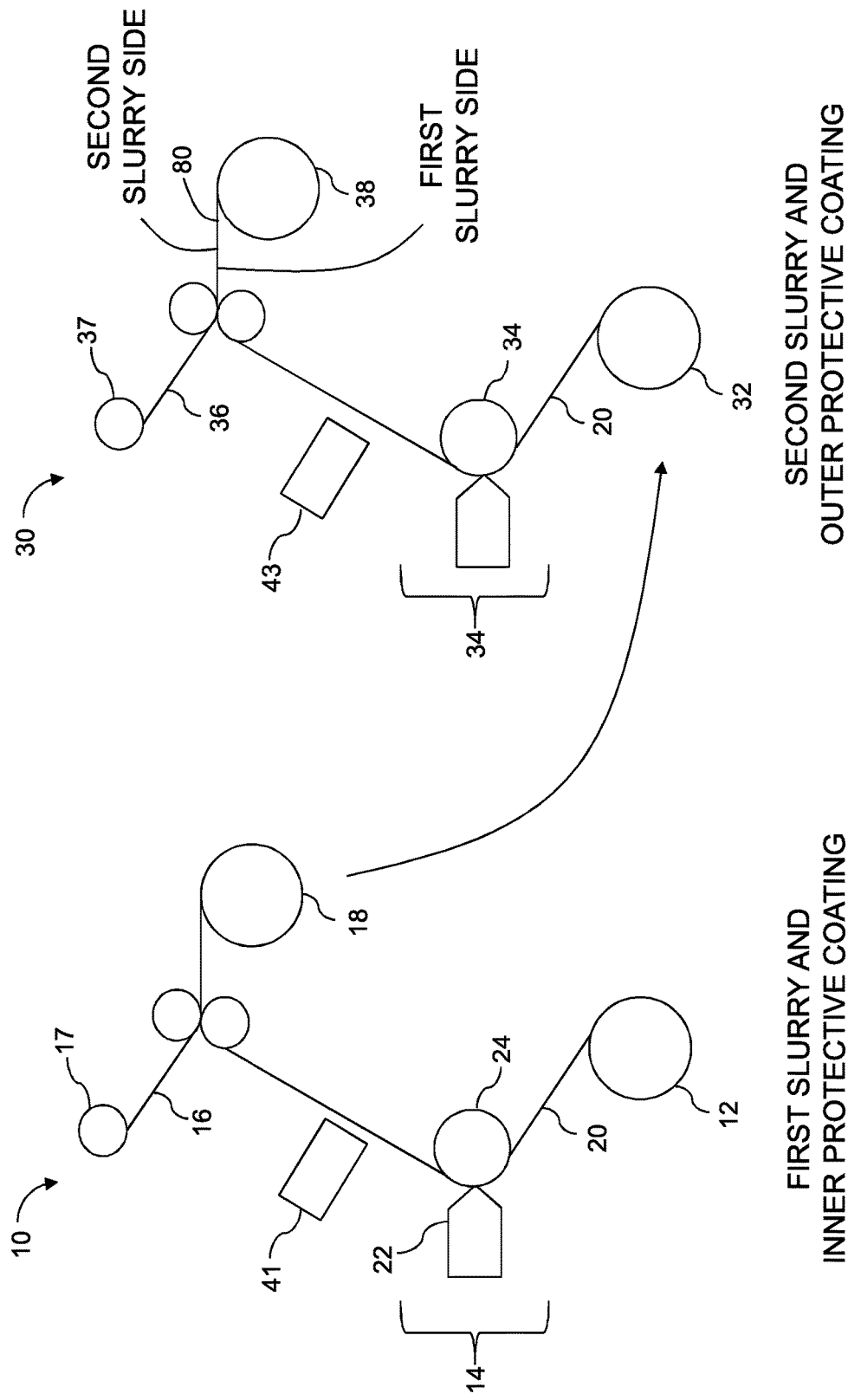
FIG. 1 are schematic diagram of single-sided roll-to-roll layouts for forming a barrier film in accordance with one embodiment.

With reference to FIG. 1, the system includes a first line 10 for coating a substrate with a first slurry a second line 30 for coating the substrate with a second slurry. In some embodiments, the first slurry includes a curable resin and the second slurry includes a curing agent, while in other embodiments the first slurry includes a curing agent and the second slurry includes a curable resin. The first line 10 includes a first unwind 12, a first coating station 14, a first interleaving web 16, and a first take-up reel 18. The separator substrate 20 is unwound from the first unwind 12 and proceeds to the first coating station 14 where a first side of the separator substrate is coated using a coating head 22 while being supported on a backing roll 22. The application of heat evaporates the slurry solvent, including water, alcohol, and ketones, resulting in a curable resin layer or a curing agent layer. The first interleaving web 16 (from a first supply roll 17) is then joined to the coated first surface of the separator substrate 20, which is then wound about the first take-up reel 18. The interleaving web 16 ensures successive wraps of the separator substrate 20 are separated from each other while on the first take-up reel 18, while also functioning as the inner protective layer in the finished multi-layer barrier film. As optionally shown in FIG. 1, first and second dryers 41, 43 can be used to evaporate a solvent from the first slurry and to evaporate a solvent form the second slurry, respectively.

More particularly, the first unwind 12 includes the separator substrate, which is generally capable of isolating the curing agent slurry from the curable resin slurry when not punctured. The separator substrate can include a polymer, for example regular polyethylene terephthalate (PET), metallized polyethylene terephthalate (mPET), polyethylene (PE), or polypropylene (PP). The separator substrate can include a high flexural modulus with ductility to reduce the development of micro-cracks and to limit crack propagation, for example a flexural modulus between 1 MPa and 4000 MPa, inclusive. The first coating station 14 generally includes a slot-die head 22 and a backing roll 24 for applying a layer of curable resin (or curing agent) on a first major surface of the separator substrate, optionally at room temperature (i.e., without a temperature treatment). Other suitable liquid coating techniques include spin-casting, drop-casting, dip-coating, knife coating, and spray-coating, for example. The slot die head 22 distributes the curable resin slurry uniformly on the substrate as it passes by. The curable resin can include an epoxide group, for example EPON Resin 8111, EPON Resin 863, EPON Resin 828, EPON Resin 162, EPON Resin 161, and EPON Resin 160 available from Hexion, Inc., optionally including an acrylate-functional group.

The single-sided coated roll is transported to the second line 30, also shown in FIG. 1. The second line 30 includes a second unwind 32, a second coating station 34, a second interleaving web 36, and a second take-up reel 38. The separator substrate 20, which is already coated with a curable resin (or curing agent) on one side thereof, is then unwound and proceeds to the second coating station where a second, opposite, side is coated with a curing agent slurry (or curable resin slurry) using a slot-die coating head 40 while supported on a backing roll 42. The application of heat evaporates the slurry solvent, including water, alcohol, and ketones, resulting in a curing agent layer (or curable resin layer). The second interleaving web 36 (from a second supply roll 37) is then joined to the newly coated surface of the separator substrate 20, and the separator substrate 20 is then wound about the second take-up reel 38. The second interleaving web 36 ensures successive wraps of the separator substrate 20 are separated from each other while on the second take-up reel 38, while also functioning as the outer protective layer in the finished barrier film. The curing agent can include a nitrogen-containing functional group (for example an imine-functional group, e.g., polyethyleneimine (PEI), or an amine-functional group) or a thiol-functional group, for example a thiol mercaptan, however the curing agent 24 can include other compounds in other embodiments. The curing agent and the curable resin are disposed on opposite sides of the separator substrate, optionally as a thin coating of between 5 μm and 200 μm, inclusive, further optionally with a thickness of between 25 μm and 75 μm, inclusive. The inner and outer protective layers can each include a polymer film liner, for example PE, PP, or high impact polystyrene.

Figure 2:
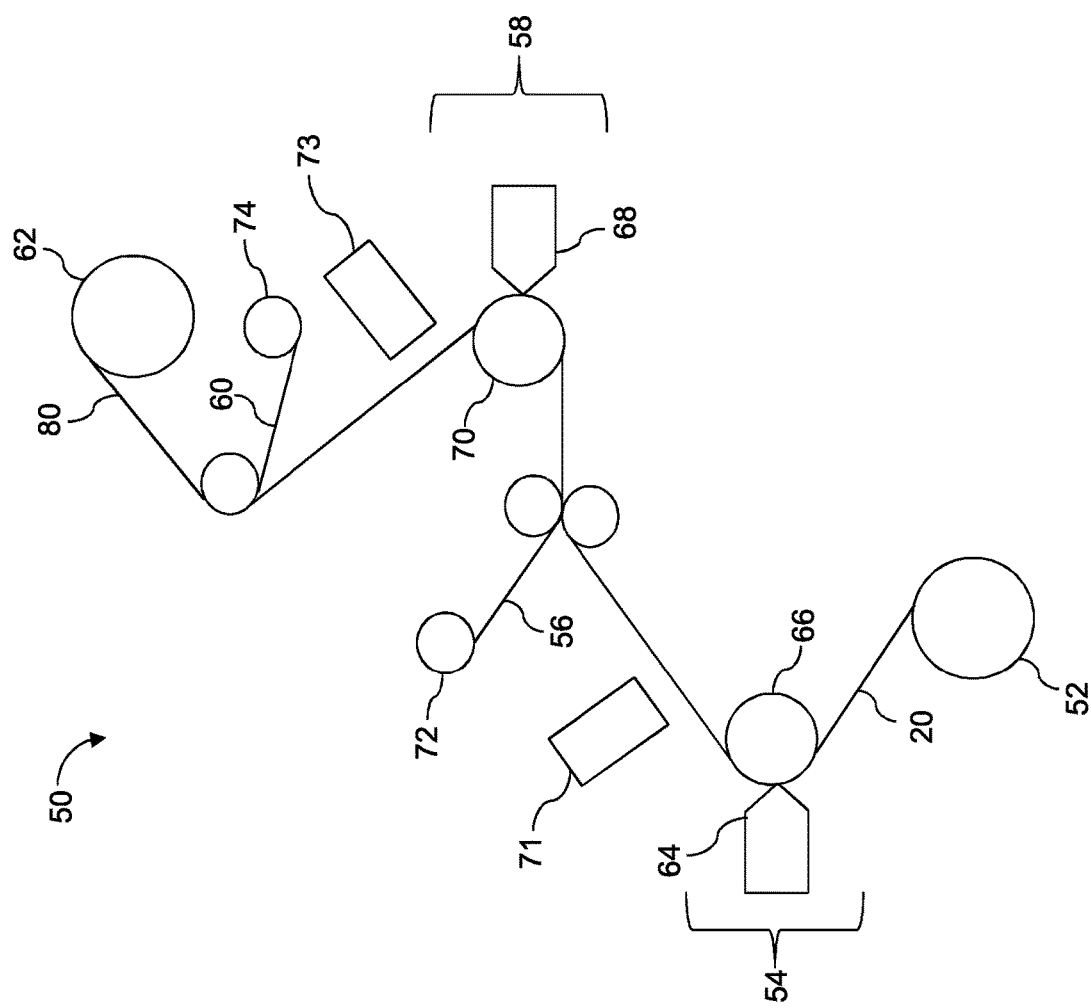
FIG. 2 is a schematic diagram of a tandem roll-to-roll layout for forming a barrier film in an inline process accordance with one embodiment.

As alternatively shown in FIG. 2, the system can include a tandem or "inline" coating process, in which a continuous web of the separator substrate is coated on both sides without winding and unwinding the separator substrate for a second process operation. This system is generally designated 50 and includes an unwind 52, a first coating station 54, a first interleaving web 56, a second coating station 58, a second interleaving web 60, and a rewind 62. The continuous separator substrate 20 is unwound and proceeds to the first coating station 54 where a first side of the separator substrate 20 is coated using a slot-die coating head 64 while being supported on a backing roll 66 The first interleaving web 56 (from supply spool 72) is then joined to the coated first surface of the separator substrate 22. The separator substrate 22 now includes the curable resin slurry and a protective web on one side thereof and proceeds to the second coating station 58 to receive the curing agent slurry on the other side thereof. At the second coating station 58, a second side of the separator substrate 20 is coated using a second slot-die coating head 68 while supported on a backing roll 70. The second interleaving web 60 (from supply spool 76) is then joined to the coated second surface of the separator substrate 20 and the multi-layered run is taken up by the rewind 62. The order of application can be reversed, however, in which the curing agent is applied first and the curable resin is applied second. In addition, first and second dryers 71, 73 can be used to evaporate a solvent from the first slurry and to evaporate a solvent form the second slurry, respectively.

Figure 3:
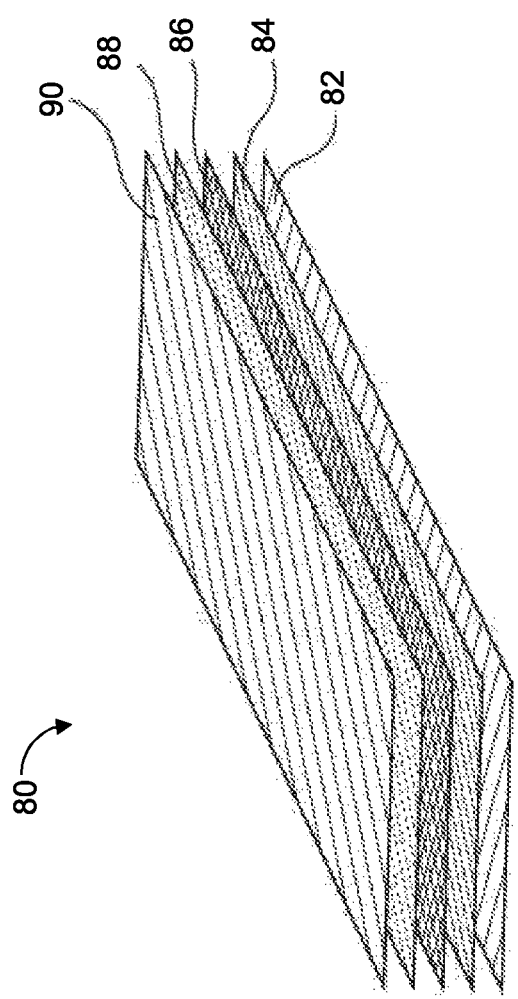
FIG. 3 is an expanded view of a barrier film including an inner protective layer, a curable resin slurry, a separator substrate, a curing agent slurry, and an outer protective layer.

At the conclusion of the roll-to-roll process of FIG. 1, and, alternatively, FIG. 2, the separator substrate 20 is part of a multi-layer barrier film 80. As shown in FIG. 3, the multi-layer barrier film 80 includes an inner protective layer 82, a curable resin layer 82, a separator substrate 86, a curing agent layer 88, and an outer protective layer 90. The inner protective layer 82 (from the first interleaving web) and outer protective layer 90 (from the second interleaving web) can include a polymer film liner, for example high impact polystyrene. The inner protective layer 82 and the outer protective layer 90 can include other laminates other embodiments, for example an oxygen barrier and/or a moisture barrier. The curable resin and the curing agent are selected to ensure that if the separator substrate 86 is punctured, the curable resin layer 84 and the curing agent layer 88 mix and react to expand and seal the puncture. For example, the curing agent is selected to have a low viscosity to readily penetrate the separator substrate 86. The curable resin, by contrast, is selected to have a sufficiently high viscosity to prevent it from flowing across the inner protective layer 82, for example a polystyrene liner which separates the curable resin 84 from the insulating core of a vacuum insulation panel. Alternatively, the curable resin can be selected to have a low viscosity to readily penetrate the separator substrate 86 while the curing agent is selected to have a sufficiently high viscosity to prevent it from flowing across the inner protective layer 82.

Figure 4:
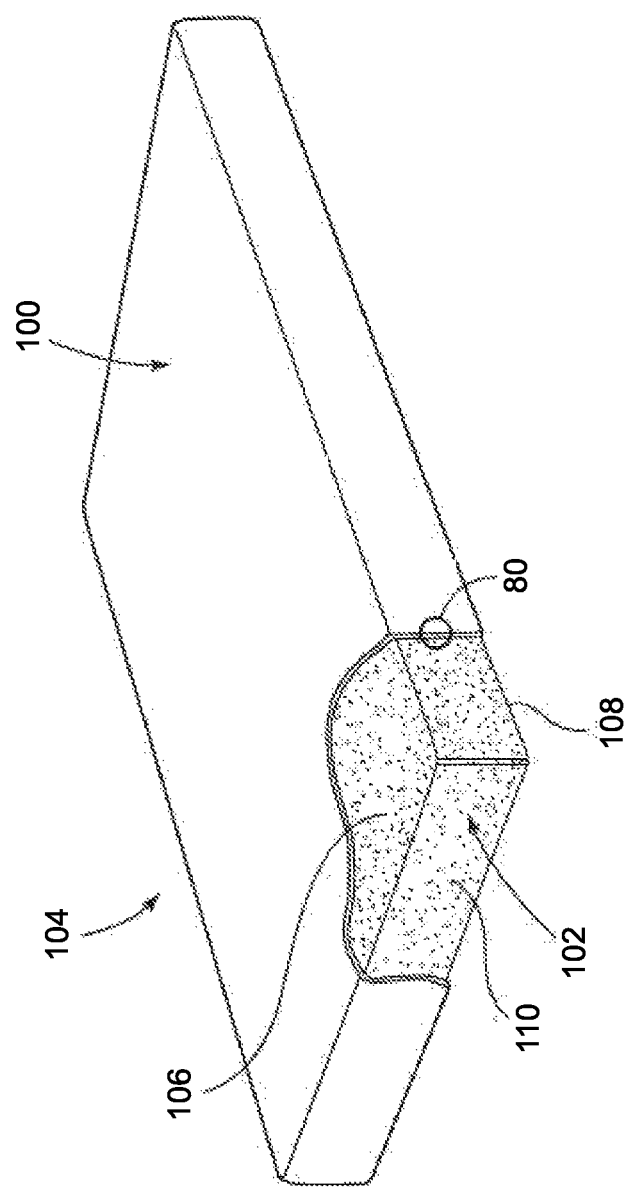
FIG. 4 is a perspective cut-away view of a vacuum insulation panel including the multi-layered barrier film of FIG. 3.

The multi-layer barrier film 80 can be used to formed into a variety of articles of manufacture, including for example tires, roofing, cargo containers, food packaging, pharmaceutical packaging, and vacuum insulation panels. One example of a vacuum insulation panel (suitable for use with the above-mentioned barrier film) is disclosed in U.S. patent application Ser. No. 16/746,149 entitled "Self-Healing Barrier Films for Vacuum Insulation Panels" to Biswas et al. and filed Jan. 17, 2020. As shown in FIG. 4, the multi-layer barrier film 80 can be formed into a barrier envelope 100, and an insulating core material 102 can be inserted into the barrier envelope 100 to define an enclosure. The enclosure is then evacuated and the barrier envelope 100 is sealed along its perimeter to form a self-healing vacuum insulation panel 104. The resulting vacuum insulation panel 104 includes a barrier envelope 100 (formed of the multi-layer barrier film 80) that surrounds an insulating core 102. The insulating core 102 includes an upper surface 106, a lower surface 108, and side surfaces 110. The insulating core 102 is fully enclosed within the flexible barrier envelope 100 and evacuated and sealed to maintain the applied vacuum therein, such that the barrier envelope 100 fully surrounds each surface 106, 108, 110 of the insulating core 102. The insulating core 102 can be formed from any suitable material having a low thermal conductivity. For example, the insulating core 102 can be formed from insulating particulate matter, including powders, fibers, and combinations of powders and fibers. Suitable insulating powders can include fumed silica or silica aerogel, while suitable insulating fibers can include fiberglass. The insulating core 102 can alternatively include open celled foams, for example polystyrene foam and polyurethane foam.

The above description is that of current embodiments of the invention. Various alterations and changes can be made without departing from the spirit and broader aspects of the invention as defined in the appended claims, which are to be interpreted in accordance with the principles of patent law including the doctrine of equivalents. Any reference to elements in the singular, for example, using the articles "a," "an," "the," or "said," is not to be construed as limiting the element to the singular.

The invention claimed is:

1. A method for manufacturing a multi-layer barrier film, the method comprising:

unwinding a separator substrate as a continues web, the separator substrate comprising a polymer and having a first surface opposite a second surface;

slot-die coating the first surface of the separator substrate with a first slurry to form a first layer thereon;

applying a first interleaving web from a first supply roll onto the first surface of the separator substrate to sandwich the first layer therebetween, the first interleaving web comprising a first polymer film liner;

slot-die coating the second surface of the separator substrate with a second slurry to form a second layer thereon;

applying a second interleaving web from a second supply roll onto the second surface of the separator substrate to sandwich the second layer therebetween, the second interleaving web comprising a second polymer film liner;

wherein one of the first slurry and the second slurry includes a curable resin slurry and the other of the first slurry and the second slurry includes a curing agent slurry, and wherein one of the first layer and the second layer includes a curable resin layer and the other of the first layer and the second layer includes a curing agent layer, the curing agent layer being capable of reacting with the curable resin layer to seal a perforation of the separator substrate; and rewinding the separator substrate together with the first interleaving web and the second interleaving web into a wound roll, wherein at least one wrap of the wound roll include the first interleaving web, the first layer, the separator substrate, the second layer, and the second interleaving web as a multi-layer barrier film, wherein the separator substrate includes non-metalized polyethylene terephthalate (PET), polyethylene (PE), or polypropylene (PP).

2. The method of claim 1 wherein slot-die coating the first slurry and slot-die coating the second slurry are performed in separate processing runs.

3. The method of claim 1 wherein slot-die coating the first slurry and slot-die coating the second slurry are performed inline as a single processing run.

4. The method of claim 1 wherein the curing agent slurry includes an imine-functional group or a thiol-functional group and wherein the curable resin slurry includes an epoxide-functional group.

5. The method of claim 1 wherein the curing agent slurry includes an imine-functional group or a thiol-functional group and wherein the curable resin slurry includes an acrylate-functional group.

6. The method of claim 1 wherein the curing agent layer and the curable resin layer each define a thickness of between 5 µm and 200 µm, inclusive.

7. The method of claim 1 further including evaporating a solvent from the first slurry to form the first layer and evaporating a solvent form the second slurry to form the second layer.

8. The method of claim 1 further including providing a first slot-die head and a first backing reel for slot-die coating the first surface of the separator substrate.

9. The method of claim 1 further including providing a second slot-die head and a second backing reel for slot-die coating the second surface of the separator substrate.

* * * * *